(12) United States Patent
Sirbu

(10) Patent No.: US 7,272,750 B2
(45) Date of Patent: Sep. 18, 2007

(54) EXPERT SYSTEM FOR INTELLIGENT TESTING

(75) Inventor: Mihai Sirbu, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 557 days.

(21) Appl. No.: 10/608,499

(22) Filed: Jun. 30, 2003

(65) Prior Publication Data

US 2004/0268318 A1    Dec. 30, 2004

(51) Int. Cl.
*G06F 11/00* (2006.01)
(52) U.S. Cl. .................................. 714/26; 709/224
(58) Field of Classification Search ............... 714/26; 709/224
See application file for complete search history.

(56) References Cited

U.S. PATENT DOCUMENTS

| | | | |
|---|---|---|---|
| 5,161,158 A * | 11/1992 | Chakravarty et al. | 714/26 |
| 5,636,344 A * | 6/1997 | Lewis | 709/224 |
| 5,850,388 A * | 12/1998 | Anderson et al. | 370/252 |
| 6,304,982 B1 * | 10/2001 | Mongan et al. | 714/38 |
| 6,526,044 B1 * | 2/2003 | Cookmeyer et al. | 370/352 |
| 6,563,301 B2 | 5/2003 | Gventer | |
| 2003/0028353 A1 | 2/2003 | Gventer | |
| 2004/0034614 A1 * | 2/2004 | Asher et al. | 707/1 |

OTHER PUBLICATIONS

"Real-Time." Microsoft Computer Dicitonary. Fifth Edition. (c) 2002. Microsoft Press.*

* cited by examiner

*Primary Examiner*—Bryce P. Bonzo
*Assistant Examiner*—Philip Guyton
(74) *Attorney, Agent, or Firm*—Steven A. Shaw; W. James Brady; Frederick J. Telecky, Jr.

(57) ABSTRACT

A computer method for testing a test unit that includes receiving an output of the test unit into a testing system, providing an expert system operably connected to the testing system, comparing, in the expert system, the output with an expected result for the output, and determining, in the testing system, if the output complies with the expected result. A system for testing a test unit includes a testing module for receiving an output of the test unit, and an expert system for comparing the output with an expected result for the output and for determining if the output complies with the expected result.

16 Claims, 4 Drawing Sheets

EXPERT SYSTEM FOR INTELLIGENT TESTING

CROSS-REFERENCE TO RELATED APPLICATIONS

None

FIELD OF THE INVENTION

The present invention relates generally to an expert system for intelligent testing of a device or software component having measurable outputs.

BACKGROUND OF THE INVENTION

Conventional testing of hardware equipment units and software modules having inputs and/or outputs has been accomplished through simulations or models of equipment operations or software functions. For example, a software model is created of a hardware unit design to test the functions of the hardware unit. Such tests are used to analyze a design or implementation of the hardware unit in a theoretical operation scenario, relying on the equivalency between the model and the actual operating environment.

Other conventional testing of hardware equipment units and software modules has been implemented to record real-time data or outputs from the units and modules and later analyzed after the real-time operation has been completed. However, such analyses cannot test and analyze real-time operations under actual operating conditions or within the system wherein the hardware unit or software module has been implemented. Conventional tests also cannot recreate in a laboratory all of the actual system parameters and designs in which equipment or software has been implemented.

For example, when testing hardware equipment units on a network, protocols analyzers connect to the communications bus of a packet network and collect and store information relating to the packets that are traveling on the bus. Typical types of information include the origin and type of packet, the number of bits in the frame, a timestamp, the destination address of the packet, and other information. This information is useful for network engineers in determining equipment requirements, the source of network problems, and in supervision and maintenance of a network. A protocol will define precisely the contents of a data unit, typically using a number of fields. Each field has a known offset from either the start of the data unit or the start of the previous field. Offsets may be in bytes, bits, octets, or other units. For example, the specific order of the fields is defined, each field being followed by a specifically defined set of possible fields, each field have a specifically defined value or set of possible values.

Conventional testing systems use microprocessors programmed by software to collect, analyze, and store testing data. However, the conventional testing systems remove a piece of equipment from its actual use in service and attempt to recreate output errors in a laboratory where configurations, inputs, and outputs are different.

SUMMARY OF THE INVENTION

The present invention relates to an expert system for intelligent testing of an equipment or software component having measurable inputs and outputs. In an exemplary embodiment, outputs of a test unit (e.g., software module or equipment unit) are compared, for example, to specific or ranges of expected output signals or results, anticipated protocols, or anticipated responses of the unit or module.

In a first aspect of the invention, a computer method for testing a test unit includes receiving an output of the test unit into a testing system, providing an expert system operably connected to the testing system, comparing, in the expert system, the output with an expected result for the output, and determining, in the testing system, if the output complies with the expected result.

In an additional aspect of the invention, the method includes evaluating relationships of the facts and the rules within the output to determine compliance of the output with the expected result.

In a further embodiment of the invention, the test unit test unit of the method includes a software code.

In a further embodiment of the invention, the method includes entering an input into the test unit from the testing system and comparing the output with the expected result according to the input. In a further embodiment of the invention, the method includes entering an input into the test unit from the testing system, and comparing the output with an anticipated response of the test unit according to the input.

In yet another aspect of the invention, the method includes receiving a second output of a second test unit into the testing system, comparing, in the expert system, the second output with a second expected result for the second output, and determining, in the testing system, if the second output complies with the second expected result.

In an additional embodiment, the method includes providing a communication link between the test unit and the second test unit, capturing a communication data transferred between the test unit and the second test unit, and analyzing, in a protocol analyzer, the communication data for compliance with a second expected result. In yet an additional embodiment, the method includes entering an input into the second test unit and comparing the second output with the second expected result according to the input.

In yet a further embodiment, the method includes providing a user interface module in the testing system that provides an external input and external output for the testing system. In an additional embodiment, the method includes providing a computer interface module in the testing system that provides an external input and external output for the testing system.

In a further aspect of the present invention, a system for testing a test unit includes a processor that includes a testing module for receiving an output of the test unit, and an expert system for comparing the output with an expected result for the output and for determining if the output complies with the expected result.

In another aspect of the invention, expert system analyzes the test unit output for a fact data, analyzes the test unit output for a protocol rule data, evaluates relationships of the fact data and the rule data between a plurality of outputs of the test unit, and determines whether the output complies with the expected result.

In an additional embodiment, the test unit includes a software code.

In a further embodiment, the system includes a control module for entering an input into the test unit, wherein the expert system compares the output with the expected result according to the input. In yet a further embodiment the system includes a control module for entering an input into the test unit, wherein the expert system compares the output with an anticipated response of the test unit according to the input.

In an additional aspect of the system, a second test unit is operably connected to the testing system, wherein the testing system receives a second output of the second test unit, and wherein the expert system compares the second output with a second expected result for the second output and determines if the second output complies with the second expected result.

In yet a further aspect of the invention, the system includes a communication link between the test unit and the second test unit and a protocol analyzer, operably connected to the testing system, wherein the testing system receives a communication data transferred between the test unit and the second test unit, and wherein the protocol analyzer analyzes the communication data for compliance with the second expected result.

In still a further embodiment, the system includes a user interface module in the testing system for providing an external input and output into the testing system. In still a further embodiment, the system includes a computer interface module in the testing system for providing an external input and output into the testing system.

BRIEF DESCRIPTION OF THE DRAWINGS

For a better understanding of the nature of the present invention, reference is had to the following figures and detailed description, wherein like elements are accorded like reference numerals, and wherein.

DETAILED DESCRIPTION OF PREFERRED EMBODIMENTS

There is described herein a preferred exemplary embodiment for intelligent and interactive testing of software modules and equipment devices, such as computer hardware or an electronic device having an output.

Figure 1:
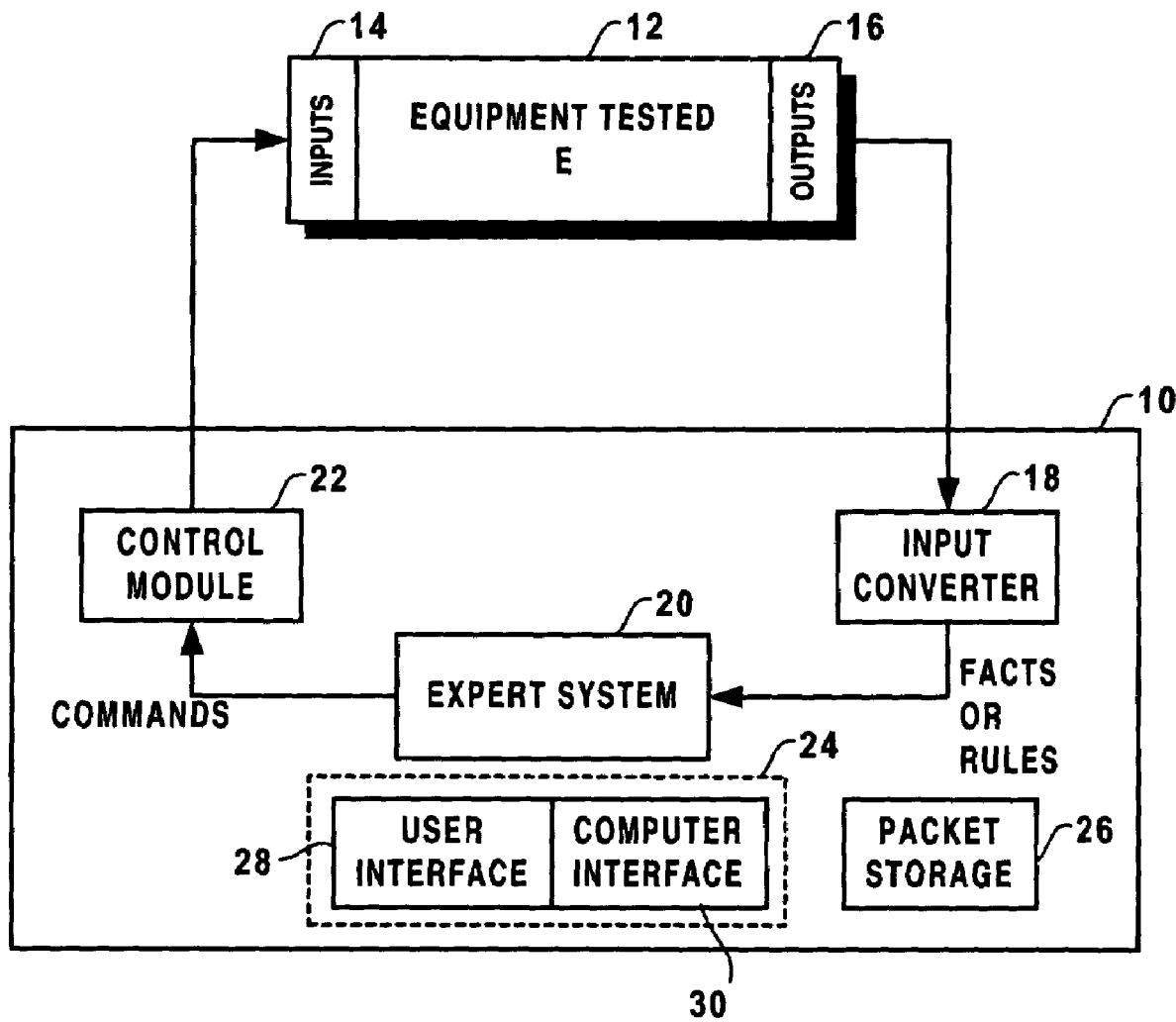
FIG. 1 is a block diagram of an exemplary expert testing system.
Figure 2:
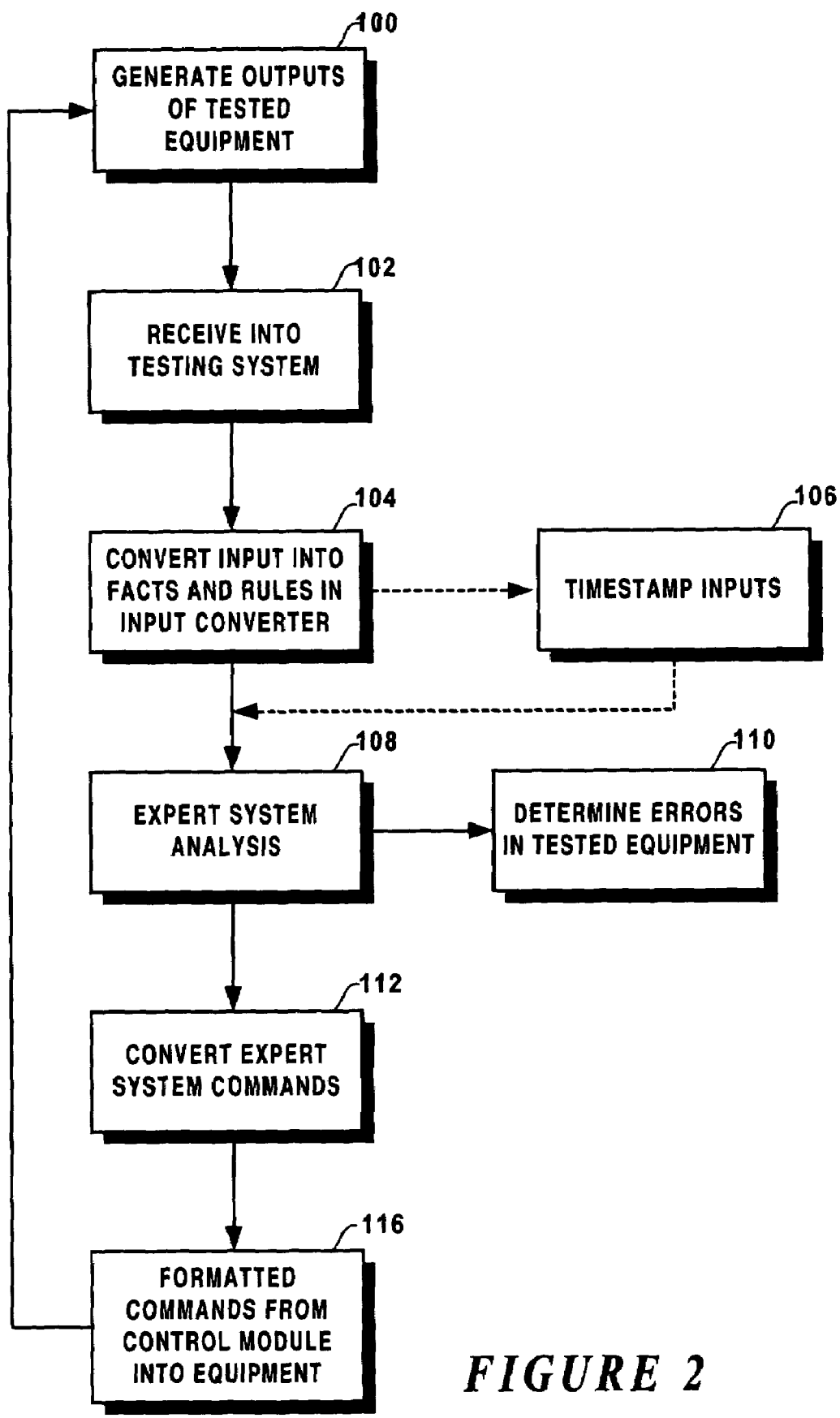
FIG. 2 is a flowchart of an exemplary method for an expert testing.

Referring to FIG. 1, there is illustrated an exemplary embodiment of an intelligent expert testing system 10 for testing outputs from an equipment unit 12. FIG. 2 is a flowchart that further illustrates an exemplary method for testing an equipment unit according to the present invention. Testing system 10 is connected to the tested equipment unit 12. Equipment 12 could include, for example, a hardware component, a software component, a full software program, or an electronic or mechanical equipment unit. Equipment unit 12 includes inputs 14 and outputs 16. Inputs 14 and outputs 16 of equipment 12 include any possible input and output for an electronic or mechanical unit, such as digital and analog signals, electromagnetic waves, sound waves, light waves, mechanical responses, chemical compositions, radiation waves, or biological entities.

Testing system 10 comprises an input converter 18 for receiving and converting outputs 16 from equipment unit 12. An expert system 20 comprises a processor and memory for operating testing system 10 that further receives inputs from input converter 18 and outputs commands. A control module 22 receives commands from expert system 20 and external inputs from an external input module 24. Control module 22 also feeds inputs 14 into equipment unit 12. Testing system 10 further includes a data storage unit 26 for storing control commands for testing unit 10 and testing data processed and analyzed by testing unit 10. Data storage includes internal or external databases and memory (not shown) that include fact and rules databases used by input converter 18. A user interface module 28 is provided to allow a user to interface directly with the testing system 10. For example, such user interfaces can be a visual display and input devices such as a keyboard and mouse (not shown). A computer interface module 30 is provided to allow an external computer (not shown) to interface with the testing system 10 through, for example, a network or other operable connection such as a wireless interface.

Referring contemporaneously to FIG. 2, equipment unit 12 generates outputs (step 100) for input into testing system 10. Testing system 10 receives outputs (step 102) from equipment unit 12 and may also receive inputs either through a dedicated link, or through conversion of inputs dedicated from user interaction with testing system 10 through user interface 28 or computer interface 30. The input converter 18 receives the outputs of equipment unit 12 and/or user interface 28 and computer interface 30 in any format and converts the outputs into facts and/or rules (step 104) for analysis by the expert system 20 (step 106). The fact base and knowledge base of the testing system 10 can be saved internally in data storage 26 or externally to the testing system and updated according to testing results. The converted inputs from step 104 may be time-stamped (step 106) for storage in data storage 26, which can be used for time-sensitive playback or for event timing analysis by expert system 20.

Expert system 20 analyzes data, facts and rules from input converter 18 and whether output 16 complies with an expected result and/or anticipated result. For example, if output 16 is a data stream from a computing device, expert system 20 determines whether output 16 complies with a protocol. Expert system 20 thereby determines whether errors exist in equipment unit 16 (step 110). A testing process of equipment unit 12 can follow a prescribed scenario, or the testing process can be the result of independent commands issued by expert system 20. The changes to equipment unit 12 are recorded by the input converter 18 and provided as facts and or rules to the expert system 20. These changes are compared with the expected behavior of equipment unit 12 as both state and time-critical behavior.

The preferred embodiment of the testing system 10 and the testing process is useful for any equipment or software module capable of outputting data or measurable signals. For computer hardware or software, the preferred embodiment of the claimed invention determines errors in outputs of a tested device (e.g., equipment unit 12) by analyzing relationships across a range of outputs appropriate to the equipment or software being tested. The outputs 16 are compared, for example, to specific or ranges of expected output signals or results, anticipated protocols, or anticipated responses of the unit 12 according to specific inputs 14 fed into the unit 12. While the technique of the preferred embodiment is also applicable to intelligent and interactive testing of software and hardware equipment units, as one skilled in the art would recognize, the present invention can be applied to any method or system that is capable of being interactively tested against expected results or anticipated responses.

Based on an analysis by expert system 20, expert system 20 issues commands to control 22. Control module 22 converts and formats commands (step 112) from expert system 20 and transmits the commands as inputs 14 for equipment unit 12 (step 116). Exemplary embodiments of equipment unit 12 require specific input types. Exemplary inputs 14 include the following: for a software module, inputs 14 include values for input arguments or changes in global variables; for a graphical user interface application, the inputs 14 through computer interface 30 include simulated mouse movements or simulated mouse clicks on specified areas of the screen; for inputs from user interface 28, inputs 14 include text entered into specific date fields or keystrokes not associated with a particular field. If the application has a command line interface, acceptable inputs 14 include command strings entered as by the user. For a hardware equipment, exemplary inputs 14 can include data signals, packets, cells, or frames present on a network interface, voltage levels on input pins, sound waves, radiation waves, or light waves. In general, an appropriate input converter 18 and control module 22 can be designed for any type of equipment unit 12.

Control module 22 may also accept commands from an external user that are sent from user interface 28 or computer interface 30 or send outputs through user interface 28 or computer interface 30. Commands may be sent in real-time to control module 22 or saved in data storage as software programs for execution at a future time or based upon an occurrence of an event or type of tested equipment unit 12.

In an exemplary test of a computer network hardware unit 12, a series of data units are transmitted as network traffic outputs 16 from hardware unit 12 into testing system 10. The testing system 10 contains at least one facts database and at least one rules database. These databases may be separated or combined together in one unit, and may be located within data storage 28 or located in an external storage area. Data units from exemplary hardware equipment 12 that enter the testing system 10 contain factual information and are constructed by hardware equipment 12 with protocol rules for the data unit contents. The data units are converted by input converter for parsing and analyzing by expert system 20 to extract individual data unit component information. New facts or new rules, determined from the data unit information, are saved into the rule or data unit databases 28. The rules database contains programmed rules based on existing protocols as well as dynamic rules generated from the analyzed data unit components. As an example, an application-specific protocol encompasses the stages of training between two hardware devices negotiating a connection under a protocol. The expert system 20 analyzes the rules and facts gained from each extracted data unit component for comparison matching on individual data units and across multiple data units with a protocol. Simple tests, such as matching IP addresses with Ethernet addresses, may be performed before data unit extraction and not recorded as facts.

Each output from equipment unit 12 can include facts relating to the output. The expert system 20 will analyze the output facts and can record contents into a fact base. The expert system will also parse the outputs for sections of rules relating to the outputs and save this information into a rule knowledge base. Analyses may be completed in real-time, or captured outputs can be stored in data storage 26. Outputs may also be stored externally to the testing system 10, allowing analysis to be performed offline from testing an equipment unit 12. The expert system 20 is easily extensible for addition protocols and diagnostics by updating the rule database with rules designed for any application, hardware, software, or protocol desired.

Results of the testing process and expert system analysis may be output through user 28 or computer 30 interfaces or saved in data storage 26. Entire testing procedures for testing system 10 that are specific to different equipment units 12 are saved into data storage 26. For example, if an exemplary hardware component "H1" is installed as equipment unit 12 for testing by testing system 10, then a saved testing setup routine and procedure for the specific hardware component "H1", or a class of hardware components named "H1", can be recalled for execution by expert system 20. Subsequently, if a software module or type of software module, "S2", is prepared for testing with testing system 10, then a saved testing setup routine and procedure for the software module "S2" can be recalled for execution by expert system 20.

Figure 3:
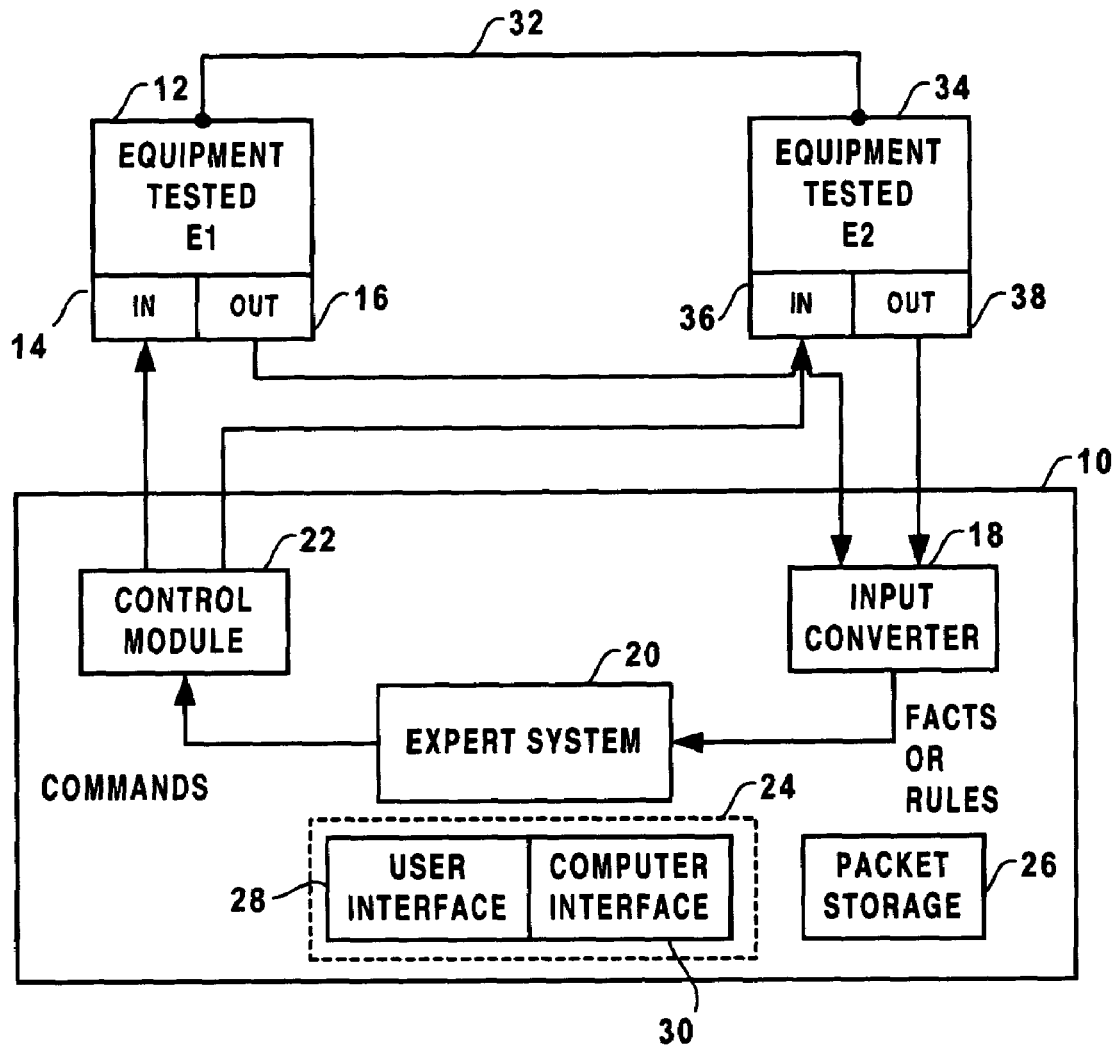
FIG. 3 is a block diagram of an alternative exemplary expert testing system comprising at least two tested equipment units.

FIG. 3 illustrates an alternative embodiment of the present invention, comprising multiple independent equipment units that can be tested simultaneously. FIG. 3 illustrates the tested equipment unit 12 of FIG. 3 that is in fact two or more connected equipment units. Testing system 10 is connected to the exemplary tested equipment unit E1 (12) and exemplary tested equipment unit E2 (34). Each of these components can have any structure as described above, such as software modules or hardware equipment. Inputs 14 and outputs 16 of equipment unit 12 and inputs 36 and outputs 38 of equipment unit 34 include any possible input and output for an electronic or mechanical unit, such as digital and analog signals, electromagnetic waves, sound waves, light waves, mechanical responses, chemical compositions, radiation waves, or biological entities.

Testing system 10 comprises an input converter 18 for receiving and converting outputs 16 from equipment unit 12. An expert system 20 comprises a processor and memory for operating testing system 10 that further receives inputs from input converter 18 and outputs commands. A control module 22 receives commands from expert system 20 and external inputs from an external input module 24. Control module 22 also feeds inputs 14 into equipment unit 12. Testing system 10 further includes a data storage unit 26 for storing control commands for testing unit 10 and testing data processed and analyzed by testing unit 10. Data storage includes internal or external databases and memory (not shown) that include fact and rules databases used by input converter 18. A user interface module 28 is provided to allow a user to interface directly with the testing system 10 through a visual display and input devices such as a keyboard and mouse (not shown). A computer interface module 30 is provided to allow an external computer (not shown) to interface with the testing system 10 through, for example, a network or other operable connection such as a wireless interface.

Equipment unit 34 is linked to equipment unit 12 through any appropriate connection 32 such that the state of at least one is dependent not only on its own inputs, but also of the inputs or states of at least one other equipment. Connection link 32 may be a network connection, cable connection, wireless connection, or any means providing communication between equipment units E1 (12) and E2 (34). Examples of a connection include are a digital network between boxes, the passing of messages between software programs, or a software module calling a function in another software module. Thus, equipment units 12, 34 may be tested contemporaneously while operating, for example, in a standard network configuration. Inputs 36 to equipment unit 34 are received from control module 22 similar to inputs 14 to equipment unit 12, as described above. Further, outputs 38 from equipment unit 34 are received by input converter 18 similar to outputs 16 from equipment unit 12. Expert system 20 analyzes both sets of outputs 16, 38 in testing processes of testing system 10.

In a first case of the alternative embodiment, multiple identical equipment units 12 and 34 are driven by the same input. Each equipment unit 12, 34 has an independent output 16, 38 linked to the input converter 18 of the testing system 10. A determination is performed to pass or fail each individual equipment unit by the expert system 20. In a second case, multiple identical units 12 and 34 are tested with independent inputs 14, 36 from testing system 10. For example, this can be the procedure if subsequent tests depend on the results of previous steps, and the tests follow distinct testing procedures. In a third case, multiple independent equipment units 12 and 34, in any homogeneous or heterogeneous combination, can be tested simultaneously by the testing system 10 with each test for each independent equipment unit running independently from one another. If the connection 32 is inactive, the environment is for all practical purposes the multiple independent test case.

In the testing procedure for the alternative embodiment in FIG. 3, output changes are related to the changes in inputs or states of all tested units. Therefore, a change in one input may be reflected in any of the available outputs. Further, if the tested equipment unit is hardware or software that operates according to a protocol, the expert system 20 can verify protocol compliance.

Figure 4:
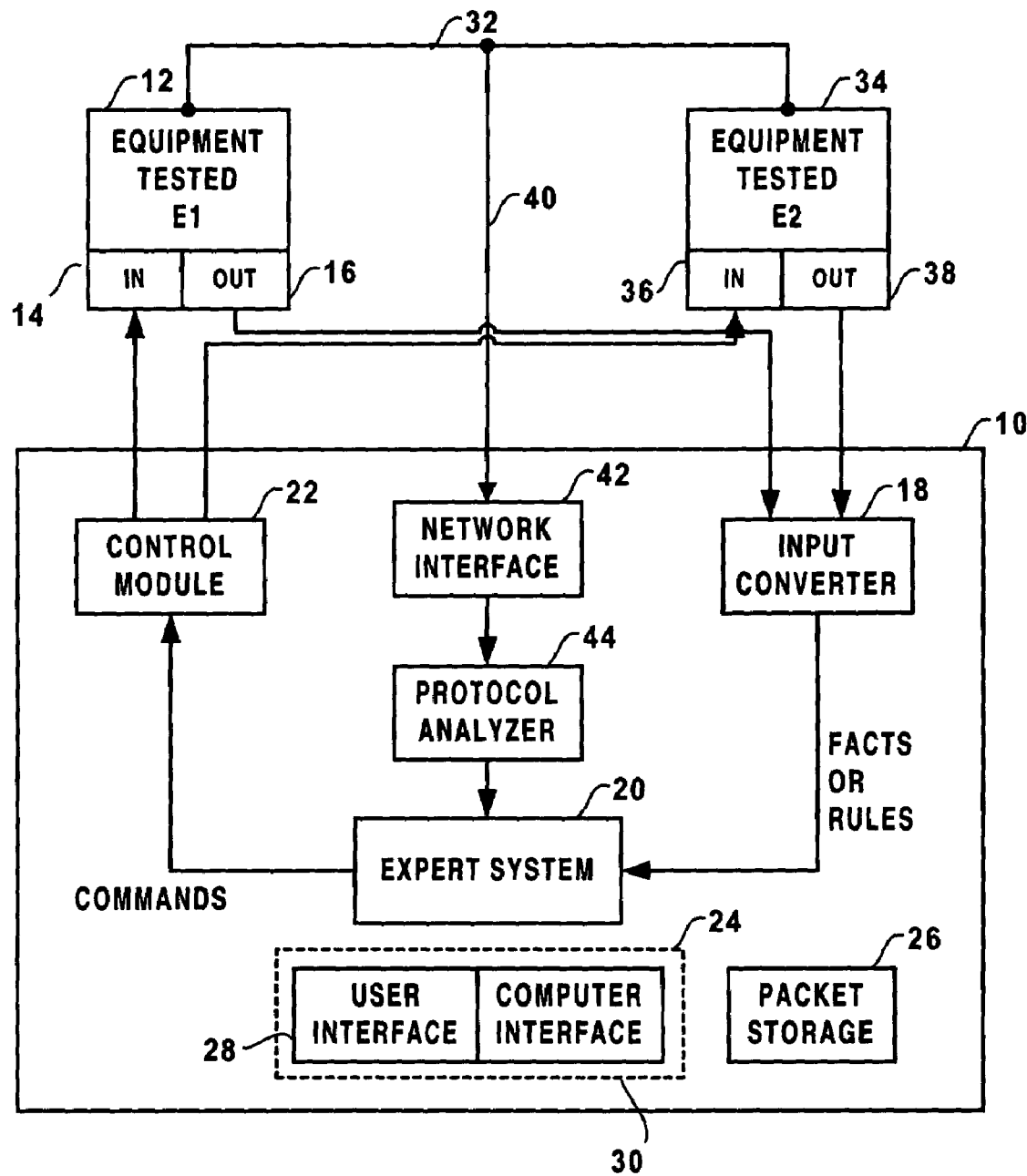
FIG. 4 is a block diagram of an alternative exemplary expert testing system comprising at least two tested equipment units and a protocol analyzer on a network.

FIG. 4 is an additional alternative embodiment illustrating the testing system 10 of FIG. 3 that further comprises network interface 42 to allow testing system a link 40 to network 32 between equipment units 12 and 34 and a protocol analyzer 44, linked to network interface 42, that analyzes network data and feeds output into expert system 20.

The protocol analyzer 44 determines errors in network transmissions by analyzing relationships across multiple protocol data units and within data units being transmitted over network line 32. The alternative embodiment is applied to a packet network. However, as one skilled in the art would recognize, the present invention can be applied to other network types, such as asynchronous transfer mode, or frame relay. Protocol analyzer 44 captures all or part of the traffic passing on the network 32 between exemplary network equipment units 12 and 34. Processing of captured packets can be performed either in real time or from stored packets that are stored and accessed in data storage 26. The protocol analyzer can be implemented with an integrated circuit, a dedicated microprocessor, or a general purpose computer.

The expert system 20 receives inputs both from the input converter 18 of the test environment and from the protocol analyzer 44. The testing system 10 drives the testing as described in embodiments illustrated in FIGS. 1-3, through specific equipment unit inputs 14, 36. The protocol analyzer 44 verifies network message exchanges based on the selected protocols and checks consistency inside packets and across multiple packets. Further, testing system 10 verifies that the protocol exchange components detected on the network 32 are correct with respect to the internal states and of the inputs 14, 36 the tested units 12, 34 have received, respectively. For example, if E1 (12) is in a particular state that is verified by testing system 10, and in that state E1 (12) should send out a message M on the network 32 to E2 (34), the expert system 20 can verify through the protocol analyzer 44 that the components of the copy of M, captured from the network 32, are correct, based on all the information stored in testing system regarding the protocols and equipment specifications.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

The invention claimed is:

1. A computer method for intelligent and interactive testing one or more equipment under test, comprising:
   connecting said one or more equipment under test to a testing system, wherein said one or more equipment under test is off-line from the normal installation of said one or more equipment under test;
   receiving an output of said one or more equipment under test into said testing system, wherein the testing system performs a real-time exchange of one of time-critical and state-critical messages and data representing real-time inputs and outputs to and from said one or more equipment under test for a protocol related to said use of said one or more equipment under test as if the one or more equipment under test is on-line in its normal installation, wherein said real-time inputs and outputs are selected from the group consisting of digital signals, analog signals, electromagnetic waves, sound waves, light waves, mechanical responses, chemical compositions, radiation waves, and biological entities;
   providing an expert system operably connected to said testing system;
   comparing, in said expert system, said real-time outputs with an expected result for said protocol at each one of said time-sensitive and state sensitive real-time inputs and real-time outputs; and
   determining, in said testing system, if said real-time outputs complies with said expected result.

2. The method of claim 1, further comprising:
   parsing the real-time outputs;
   analyzing the real-time outputs for fact data in said expert system;
   analyzing the real-time outputs for rule data in said expert system;
   generating dynamic rules to supplement programmed rules; and
   evaluating relationships of the facts and the rules within said real-time outputs across multiple input and output data units exchanged between the test system and said one or more equipment under test to determine compliance of said output with said protocol at each one of said time-sensitive and state sensitive inputs for the expected protocol output rule data and fact data resulting from the inputs.

3. The method of claim 1, wherein said one or more equipment under test are selected from the group consisting of a hardware component, a software component, a full software program, an electronic, and a mechanical equipment unit.

4. The method of claim 1, further comprising:
   entering a plurality of inputs in addition to said real-time inputs into said one or more equipment under test from said testing system; and
   comparing a plurality of outputs with said expected result according to said plurality of inputs.

5. The method of claim 1, further comprising:
converting a plurality of commands from expert system:
formatting said plurality of commands into proper format for said protocol;
entering said formatted commands as input into said one or more equipment under test from said testing system; and
comparing said output with an anticipated response of said one or more equipment under test according to said input.

6. The method of claim 1, further comprising:
providing a communication link between a first of said one or more equipment under test and a second of said one or more equipment under test, wherein said second of said one or more equipment under test is connected said first of said one or more equipment under test in the laboratory environment, wherein the second of said one or more equipment under test is off-line from the normal installation of the second of said one or more equipment under test;
capturing a communication data transferred between said first of said one or more equipment under test and said second of said one or more equipment under test, wherein the capturing captures a real-time exchange of one of time-critical and state-critical messages and the data representing real-time inputs and outputs to and from the first of said one or more equipment under test and the second of said one or more equipment under test for the protocol as if the second of said one or more equipment under test is on-line in its normal installation; and
analyzing, in a protocol analyzer, outputs from said second of said one or more equipment under test for compliance with the real-time protocol exchange between the first of said one or more equipment under test and the second of said one or more equipment under test.

7. The method of claim 1, further comprising:
providing a user interface module in said testing system that provides an
external input and external output for the testing system.

8. The method of claim 1, further comprising:
providing a computer interface module in said testing system that provides an external input and external output for the testing system.

9. A system for intelligent and interactive testing one or more equipment under test, comprising:
a processor, comprising:
a testing module for receiving an output of said one or more equipment under test, wherein said one or more equipment under test is connected to a testing system, wherein said one or more equipment under test is off-line from the normal installation of the said one or more equipment under test, and wherein the testing system performs a real-time exchange of one of time-critical and state-critical messages and data representing real-time inputs and outputs to and from the test unit for a protocol related to said use of said one or more equipment under test as if the unit is on-line in its normal installation, wherein said real-time inputs and outputs are selected from the group consisting of digital signals, analog signals, electromacinetic waves, sound waves, light waves, mechanical responses, chemical compositions, radiation waves, and biological entities; and
an expert system for comparing said output with an expected result for said output and for determining if said output complies with said expected result for said protocol at each one of said time-sensitive and state sensitive inputs and outputs.

10. The system of claim 9, wherein said expert system analyzes said one or more equipment under test output for a fact data, analyzes the said one or more equipment under test output for a protocol rule data, evaluates relationships of said fact data and said rule data between a plurality of outputs of said one or more equipment under test across multiple input and output data units exchanged between the test system and said one or more equipment under test, and determines whether said output complies with said protocol at each one of said time-sensitive and state sensitive inputs for the expected protocol output rule data and fact data resulting from the inputs.

11. The system of claim 9, wherein said one or more equipment under test are selected from the group consisting of a hardware component, a software component, a full software program, an electronic, and a mechanical equipment unit.

12. The system of claim 9, further comprising:
a control module for entering an input into said one or more equipment under test, wherein said expert system compares said output with said expected result according to said input.

13. The system of claim 12, wherein said control module converts and formats a plurality of commands from expert system and transmits said commands as input into said one or more equipment under test, wherein said expert system compares said output with an anticipated response of said one or more equipment under test according to said input.

14. The system of claim 9, further comprising:
a communication link between a first of said one or more equipment under test and a second of said one or more equipment under test wherein said second of one or more equipment under test is connected first of said one or more equipment under test in the laboratory environment, wherein the second of said one or more equipment under test is off-line from the normal installation of the second of said one or more equipment under test; and
a protocol analyzer, operably connected to said testing system, wherein said testing system captures a real-time exchange of one of time-critical and state-critical messages and the data representing real-time inputs and outputs to and from the first of said one or more equipment under test and the second of said one or more equipment under test for the protocol as if the second of said one or more equipment under test is on-line in its normal installation, and wherein said protocol analyzer analyzes said communication data for compliance with the real-time protocol exchange between the first test unit and the second of said one or more equipment under test.

15. The system of claim 9, further comprising:
a user interface module in said testing system for providing an external input and output into said testing system.

16. The system of claim 9, further comprising:
a computer interface module in said testing system for providing an external input and output into said testing system.

* * * * *